Patented May 17, 1938

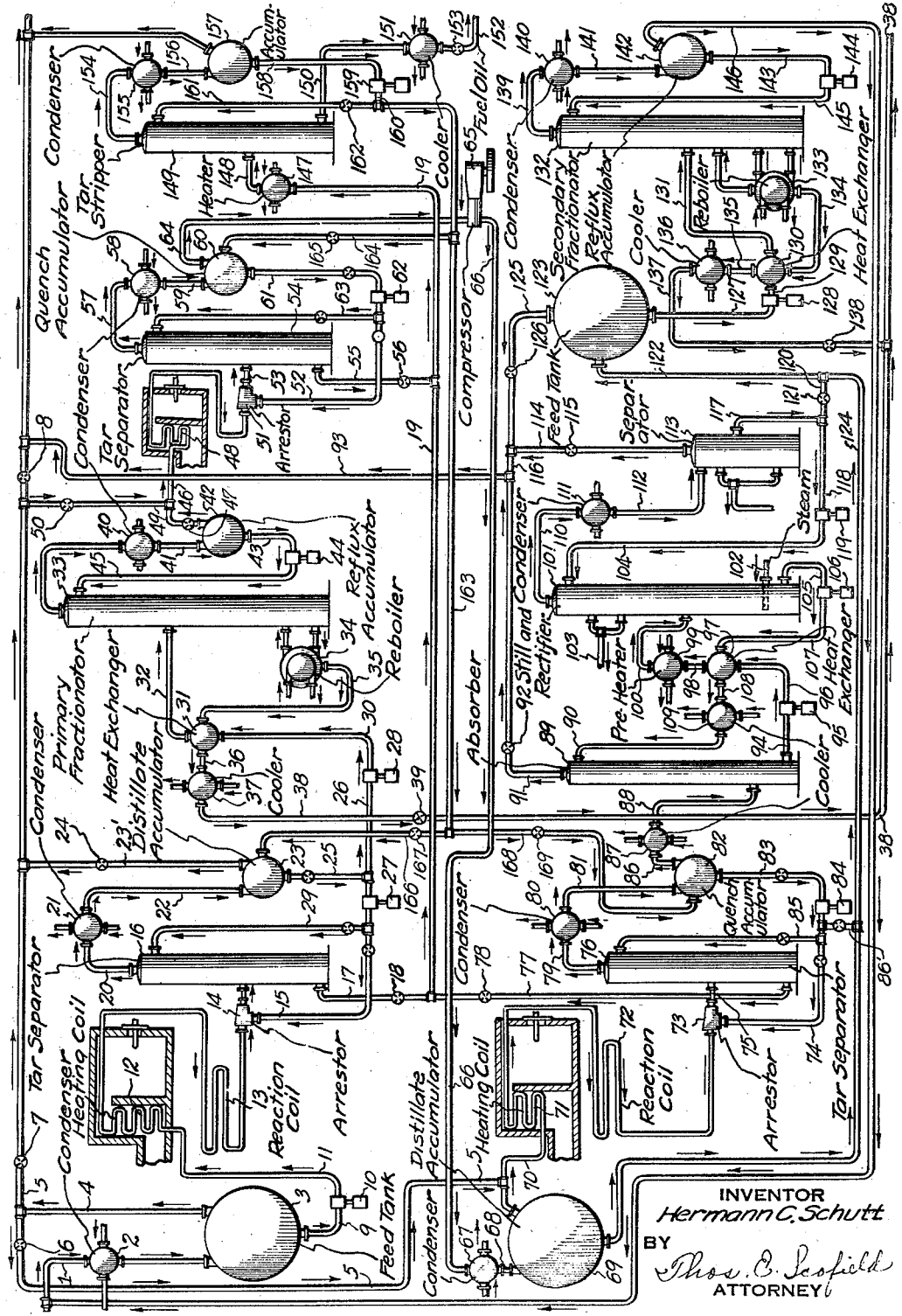

2,117,457

UNITED STATES PATENT OFFICE 2,117,457

METHOD OF CONVERTING HYDROCARBONS

Hermann Claus Schutt, North Tarrytown, N. Y., assignor, by mesne assignments, to The Pure Oil Company, Chicago, Ill., a corporation of Ohio Application October 24, 1935, Serial No. 46,542

11 Claims. (Cl. 196—10)

My invention relates to a process and apparatus for cracking and polymerizing hydrocarbons, under suitable conditions of temperature and pressure, to convert the same into polymers, including aromatic and other cyclic compounds such as naphthenes, having valuable anti-detonation characteristics and suitable for use as motor fuel.

It is a primary object of my invention to provide a process in which low-boiling hydrocarbons such as occur in petroleum refinery gas, particularly gases containing a considerable amount of unsaturates such as gases from liquid phase, liquid-vapor or vapor phase cracking still operations, may be converted into heavier hydrocarbons of the aromatic series, under conditions which will result in a high yield of high octane aromatic-containing liquid boiling within the range of the nature of gasoline motor fuel, and minimize the formation of undesirable products such as tar and fixed gases, e. g., methane and ethane.

In general, my process comprises the separation of the mixture to be used as charging stock, as for example, a gas containing aliphatic $C_2$, $C_3$ and $C_4$ hydrocarbon compounds preferably comprising in excess of thirty per cent unsaturates, into fractions respectively more difficultly polymerizable in accordance with the increased molecular weight of the unsaturates in successive fractions, subjecting the most difficultly polymerizable fraction, as for example, that containing substantially $C_3$ and $C_4$ unsaturated compounds, to high temperature, high pressure polymerization conditions most favorable to the production of the maximum yield of desired aromatic hydrocarbons which may be obtained from that particular fraction, separating the aromatic products from the unreacted low boiling hydrocarbons, subjecting the unreacted hydrocarbons, as for example, the saturated $C_3$ and $C_4$ compounds, to high temperature, low pressure cracking conditions most favorable to the maximum yield of lighter, more easily polymerizable compounds, as for example, substantially $C_2$ unsaturated hydrocarbons, separating these lighter, more easily polymerizable compounds as a fraction from the liquid products formed, subjecting this light fraction to high temperature, low pressure polymerization conditions most favorable to the production of the maximum yield of desired aromatic products therefrom, separating the liquid products from the lower boiling hydrocarbons, recycling the lower boiling hydrocarbons to the initial separating step and removing stabilized aromatic-containing products of the nature of motor fuel from the system.

In accordance with my invention, I may pass the lighter compounds, as for example, the $C_2$ hydrocarbons of the starting mixture directly to the intermediate cracking step when these form a relatively small percentage of the starting mixture, to convert the $C_2$ saturates to unsaturates for polymerization in the subsequent low pressure polymerization stage. On the other hand, when the percentage of lighter $C_2$ unsaturates in the starting mixture is relatively high, it may be preferable to pass these directly to the low pressure polymerization stage for the production of a maximum yield of desired aromatic products.

I have found that the operating conditions most suitable for effecting polymerization of heavier unsaturates undergoing treatment, e. g., butylene, are not suitable for the polymerization of ethylene since the latter will polymerize much more rapidly under the same temperature-pressure conditions. Hence, I have found it desirable to separate the hydrocarbons according to boiling point as a measure of reaction velocity and subject them to separate stages of polymerization and most favorable to the velocity constant, or reaction velocity, of each.

I have also found that during the polymerization of the $C_3$ and $C_4$ compounds, a part of the saturates present are converted to lighter unsaturates. The complete conversion of these saturates to $C_2$ unsaturates is best carried out, however, by a subsequent cracking of all or a part of the polymerization reaction products from which the aromatic and other higher boiling products formed during the initial polymerization stage have been substantially removed. The endothermic character of the cracking reaction is such as to permit cracking of the $C_2$, $C_3$ and $C_4$ compounds as a group at an average temperature without excessive decomposition of the heavier $C_4$ compounds to coke or tar. I do not, therefore, deem it essential that the separation of the $C_2$, $C_3$ and $C_4$ saturates into their respective fractions and cracking of each separately be practiced though such operation would more nearly approach ideal conditions for optimum conversion of the saturates to unsaturates.

Assuming the charging gas to have the following composition, I cool the gas under pressure to substantially separate the $C_3$—$C_4$ compounds as a liquid from the $C_2$ compounds and methane as follows:

Table

|  | Mol. per cent liquid | Mol. per cent gas |
|---|---|---|
| Methane $CH_4$ | 5.8 | 57.8 |
| Ethylene $C_2H_4$ | 1.7 | 11.2 |
| Ethane $C_2H_6$ | 11.7 | 24.2 |
| Propylene $C_3H_6$ | 38.4 | 4.5 |
| Propane $C_3H_8$ | 14.6 | 1.5 |
| Butylene $C_4H_8$ | 19.0 | .8 |
| Butane $C_4H_{10}$ | 8.8 | |
| | 100.0 | 100.0 |

The liquid fraction containing the $C_3$—$C_4$ compounds is pumped directly to a heating coil where it is brought up to a temperature sufficient to initiate the exothermic polymerization reaction after which it is passed to a high pressure, high temperature reaction coil, preferably of larger cross-sectional area than the heating coil, controlled as to temperature, where the polymerization reaction is permitted to take place. The reaction coil may be operated at a mean temperature range of from 1050° F. to 1150° F., preferably at about 1080 F. and at a mean pressure range of 200 lbs./sq. in. gauge to 400 lbs./sq. in. gauge, preferably at about 300 lbs./sq. in. gauge. The polymerization reaction products withdrawn from the reaction coil may be quenched to a temperature below approximately 600° F. and preferably about 425° F., to inhibit the polymerization reaction, the products after fuel oil and tar separation being cooled and fractionated to recover aromatic and other liquid products formed by the polymerization reaction.

The low boiling compounds such as the $C_3$—$C_4$ saturates remaining uncondensed are passed to a low pressure, high temperature gas cracking coil primarily for conversion of saturates to $C_2$ unsaturates. The cracking reaction may be carried out in the heating coil at a temperature range of from 1325° F. to 1600° F., preferably about 1375° F., and at a pressure range of from 25 lbs./sq. in. gauge to 125 lbs./sq. in. gauge, preferably about 75 lbs./sq. in. gauge. The charge to the gas cracking coil, though primarily consisting of the gases remaining uncondensed after separation of the aromatic-containing products formed by the polymerization operation, may be supplemented by the addition thereto of the uncondensed $C_2$ gases of the initial separating operation and the gases separated during the cooling of the polymerization products for the removal of tar and fuel oil formed. Obviously, there will be some polymerization of the unsaturates present and formed during the gas cracking operation. These unsaturates, as for example, the $C_2$ compounds, will form desired aromatic products. The reaction products withdrawn from the heating coil may be quenched to below active cracking temperature, i. e., to a temperature ranging below approximately 600 F., preferably about 250° F. The tar and fuel oil formed is then separated from the gaseous constituents which are compressed and cooled to condense the desired aromatic products present. The gases remaining uncondensed contain the $C_2$ unsaturates and form the charge to the low pressure, high temperature polymerization coil. Where the gases remaining uncondensed after liquefaction of the feed for the first polymerizing coil contain a relatively high percentage of $C_2$ unsaturates, I prefer to charge these gases directly to the low pressure, high temperature polymerization coil rather than to the gas cracking coil as previously described.

The gaseous charge to the heating coil of the low pressure polymerization stage may be passed thereinto at a pressure of from 150 lbs./sq. in. gauge to 300 lbs./sq. in. gauge, preferably at about 225 lbs./sq. in. gauge and rapidly brought up to a temperature sufficient to initiate the polymerization reaction after which it passes to a reaction coil of greater cross-sectional area than the heating coil, controlled as to temperature. The exothermic polymerization reaction is permitted to go on in the reaction coil which may be maintained at a mean pressure ranging from 15 lbs./sq. in. gauge to 120 lbs./sq. in. gauge, preferably about 80 lbs./sq. in. gauge, and at a mean temperature ranging from 1100° F. to 1300° F., preferably about 1200° F. Following the proper time interval for polymerization, the reaction products may then be quenched to a temperature below approximately 600° F., preferably about 325° F. to inhibit further polymerization. The products, following the removal of tar and fuel oil formed during the polymerization reaction, is subjected preferably to steps of absorption and rectification for the recovery of unstabilized aromatic-containing liquid free of fixed gases such as hydrogen and methane which latter are vented as residue gas.

These unstabilized aromatic containing products together with those recovered by compression and cooling of the reaction products from the cracking reaction are fractionated at high pressure for the recovery of the stabilized aromatic-containing products of the nature of motor fuel. The overhead products of the fractionating operation will consist mainly of a mixture of $C_3$—$C_4$ compounds, containing from forty per cent to eighty per cent unsaturates and may be condensed under pressure and recycled for subsequent polymerization in the high pressure polymerization coil.

The tar and fuel oil separated from the reaction products of each of the polymerization and cracking operations contain considerable light distillate recoverable by stripping at pressures ranging from 10 lbs./sq. in. gauge. This liquid is used as a quench medium supplementing that recovered by cooling and condensation of a portion of the quenched reaction products at higher pressures.

It is to be understood that the temperatures maintained in the respective reaction coils may be varied according to the type and amount of hydrocarbons introduced, the pressure under which the respective polymerization and reaction coils may be operated, and the time of exposure of the gases to the operating temperature. In case an extremely high octane number is not desired, the polymerization operations may be conducted at pressures of the order of 400 lbs./sq. in. gauge to 3000 lbs./sq. in. gauge with correspondingly lower polymerization temperatures ranging upward from 700° F.

The accompanying drawing which forms part of this specification and is to be read in conjunction therewith, is a schematic showing of apparatus in accordance with my invention.

Refinery or pressure still gas may be introduced into the system through pipe 1 at a pressure of from 250 to 350 lbs./sq. in. gauge, preferably about 300 lbs./sq. in. gauge, partially liquefied in the condenser 2 and passed into a feed tank 3. Assuming the gas charged to comprise mainly $C_2$, $C_3$ and $C_4$ hydrocarbons, the hydrogen present, methane and mainly $C_2$ hydrocarbons may be withdrawn from the tank through the pipe 4 and passed into the light gas feed pipe 5. The direction of gas flow in this pipe may be selected by suitable manipulation of the pressure control valves 6, 7 and 8 as will be more fully explained hereinafter.

The liquefield $C_3$ and $C_4$ hydrocarbons in the tank 1 may be withdrawn therefrom through the pipe 9 and charged by the pump 10 through the pipe 11 at a pressure of about 400 lbs./sq. in. gauge to the heating coil 12 of the high pressure polymerization stage where the reactant in passing through the coil is brought up to the desired polymerization temperature. The reactant discharges from the heating coil 12 into the reaction coil 13 where a mean temperature of about 1080° F. and a mean pressure of about 300 lbs./sq. in. gauge may be maintained. The time allowed for passage of the reactant through the coil 13 is sufficient to effect maximum conversion of the $C_3$—$C_4$ unsaturates to higher boiling aromatic products. On leaving the reaction coil, the reaction products are immediately contacted in the arrester 14 with a cool light quench distillate entering the arrester through the pipe 15 and suddenly cooled to a temperature of about 425° F. to inhibit further polymerization, the quenched products passing from the arrester into a tar separator 16.

The fuel oil and tar separator 16 functions to remove such heavy polymers from the reaction products as are formed during the polymerization reaction, the tar and fuel oil being discharged under the existing pressure through the pipe 17 into the feed pipe 19 by which the tar is conveyed to a subsequent stripping operation. A valve 18 in the pipe 17 controls the passage of tar into the pipe 19. Bubble plates or other suitable fractionating trays (not shown) and internal refluxing in the separator ensure sharp separation of the tarry products and the lower boiling hydrocarbons. The uncondensed hydrocarbons may be withdrawn through the pipe 20, pass through a condenser 21 and pipe 22 into the distillate accumulator 23. The distillate accumulator may be maintained at a pressure of from 215 lbs./sq. in. gauge to 325 lbs./sq. in. gauge, preferably about 275 lbs./sq. in. gauge. Gases may be vented from the accumulator through pipe 23′ and control valve 24 into the light gas feed pipe 5. The vented gases will be largely $C_2$ hydrocarbons with some methane and hydrogen.

Condensate in the accumulator 23 may be withdrawn through the pipe 25 and pipe 26 by means of the pumps 27 and 28. The pump 27 returns a portion of its feed as quench distillate through pipe 15 to the arrester 14 and the remainder through pipe 29 to the tar separator as reflux. The pump 28 forces its condensate feed through pipe 30, heat exchanger 31 and pipe 32 to primary fractionator 33.

The fractionator 33 may be operated at a pressure of from 250 lbs./sq. in. gauge to 350 lbs./sq. in. gauge and by means of bubble trays (not shown), refluxing and reboiling of the fractionator bottoms in reboiler 34, a stabilized aromatic-containing liquid of the nature of motor fuel of 85 to 90 Octane No. CFR Motor Method is formed. This liquid, or polymer gasoline, passes from the reboiler 34 through pipe 35, heat exchanger 31, pipe 36, and cooler 37 into pipe 38 having pressure control valve 39. The polymer gasoline in pipe 38 is combined with other polymer gasoline formed as will be hereinafter shown, to produce a motor fuel of high blending value.

The overhead products of the fractionator 33 will consist of $C_3$—$C_4$ saturated compounds which pass through the condenser 40, pipe 41 and into the reflux accumulator 42. Condensate is withdrawn through the pipe 43 by means of the pump 44 and returned thereby through pipe 45 to the primary fractionator as reflux.

Uncondensed $C_3$—$C_4$ gases may be vented at the accumulator pressure through pipe 46 and pressure control valve 47 into the heating coil 48 of the gas cracking unit. The charge to the gas cracking coil may be supplemented by the $C_2$ gases in pipe 5 which flow therefrom through pipe 49 and pressure reducing valve 50 into pipe 46. Valve 8 in line 5 may be partially or entirely closed.

The reactant in the gas cracking coil may be preferably subjected to a temperature of about 1375° F. at a pressure of about 75 lbs./sq. in. gauge so as to form a maximum of $C_2$ unsaturates as well as such aromatic-containing products of the nature of motor fuel as result from the conversion of $C_2$ unsaturates during the cracking interval. The reaction products discharged from the cracking coil are immediately quenched in arrester 51 to about 250° F. by cool light distillate from pipe 52, the quenched products passing through pipe 53 into fuel oil and tar separator 54.

The tar separator 54 may be provided with suitable fractionating trays (not shown) and by suitable refluxing, a separation of such heavy tar and fuel oil as was formed by the cracking reaction from the lower boiling hydrocarbons, is effected. The tar separated flows through pipe 55 and pressure reducing valve 56 into feed line 19 for subsequent stripping, as will be more fully described hereinafter.

The overhead products of the tar separator 54 pass through pipe 57, condenser 58 and pipe 59 into the quench accumulator 60. Due to pressure drop, the accumulator pressure will range from 20 lbs./sq. in. gauge to 120 lbs./sq. in. gauge, preferably about 65 lbs./sq. in. gauge with the resultant formation of but a small quantity of condensate. I propose to supplement this condensate with quench distillate recovered from stripping of the tar as will be more fully described hereinafter. Condensate is withdrawn from the accumulator through pipe 61 by pump 62 which returns a portion through pipe 52 as quench distillate to arrester 51. The remainder is fed through pipe 63 as reflux to the tar separator 54.

Uncondensed low boiling hydrocarbons pass from the accumulator through the pipe 64 to compressor 65 by which they may be compressed to from 150 lbs./sq. in. gauge to 350 lbs./sq. in. gauge, preferably about 250 lbs./sq. in. gauge, and then passed through pipe 66, condenser 67 and pipe 68 into distillate accumulator 69. At the pressure in the accumulator 69 of from 150 lbs./sq. in. gauge to 300 lbs./sq. in. gauge, preferably 225 lbs./sq. in. gauge, the uncondensed low boiling hydrocarbons will be mainly $C_2$ compounds, primarily unsaturates formed by the cracking reaction. The condensate will be aromatics of the nature of motor fuel formed due to such polymerization of $C_2$ unsaturates as took place in the gas cracking coil 48.

Gaseous $C_2$ hydrocarbons pass from the accumulator 69 through the pipe 70 into heating coil 71 of the relatively low pressure polymerization stage. When the percentage of $C_2$ unsaturates in the gases fed to the system through the pipe 1 is sufficiently high to render immediate polymerization of these gases feasible, valves 7 and 8 in pipe 5 are closed and valve 6 is opened so that the $C_2$ hydrocarbons withdrawn from the feed tank 3 through the pipe 4 pass through pipe 5 and are commingled with gases in pipe 70 passing to the heating coil 71.

The reactant may be heated in coil 71 sufficiently to initiate the polymerization reaction and passes into reaction coil 72 where exothermic polymerization may proceed at a mean temperature of about 1200° F. and a mean pressure of about 80 lbs./sq. in. gauge. The reactant after a time interval sufficient to form the desired aromatic-containing products discharges into arrester 73 wherein it is contacted with cool light distillate entering the arrester through pipe 74. The reaction products are quenched in the arrester to a temperature of about 325° F. to inhibit the polymerization reaction, the quenched reaction products passing through pipe 75 into tar and fuel oil separator 76.

The tar separator 76 by means of suitable fractionating trays (not shown) and cooling reflux effects a separation of heavy tarry polymers and fuel oil formed from the lower boiling hydrocarbons. The tar separated discharges through pipe 77 and pressure reducing valve 78 into pipe 19 for subsequent tar stripping, as will be more fully described hereinafter.

The uncondensed overhead products of the tar separator pass through pipe 79, condenser 80 and pipe 81 into quench distillate accumulator 82 which may be maintained under a pressure of from 25 lbs./sq. in. gauge to 100 lbs./sq. in. gauge, preferably about 50 lbs./sq. in. gauge, and a temperature of from 100° F to 200° F., preferably about 125° F. In the accumulator 82, a separation of condensate from the uncondensed hydrocarbons is made. The condensate is withdrawn through pipe 83 by pump 84 and returned thereby through pipe 74 to arrester 73 as quench distillate and through pipe 85 to the separator 76 as reflux. Excess condensate from accumulator 82 may be passed through valve-controlled line 86' and joined with the condensate leaving distillate accumulator 69. The uncondensed hydrocarbons pass from the accumulator 82 through pipe 86, cooler 87 and pipe 88 into absorber 89 of an absorption unit.

The gas feed may enter the absorber at a temperature of from 60° F. to 100° F., preferably about 80° F., and at a pressure of from 25 lbs./sq. in. gauge to 100 lbs./sq. in. gauge, preferably about 50 lbs./sq. in. gauge, and passes through the absorber countercurrent to downflowing lean absorption oil entering the absorber through pipe 90. The aromatic and other normally liquid products of the nature of motor fuel together with most of the $C_3$—$C_4$ hydrocarbons which comprise from forty per cent to eighty per cent unsaturates, are removed from the gases by the absorption oil, the residual hydrogen, methane and some $C_2$ hydrocarbons passing off through pipe 91, pressure reducing valve 92, and pipe 93 into the residual gas pipe 5, in which valve 8 may be partially or entirely closed.

The rich absorption oil is withdrawn through pipe 94 by pump 95 and passes through pipe 96, heat exchanger 97, pipe 98, preheater 99 and pipe 100 into combined still and rectifier tower 101. The oil may enter the tower 101 at a pressure of from 250 lbs./sq. in. gauge to 450 lbs./sq. in. gauge, preferably about 325 lbs./sq. in. gauge, and at a temperature of from 450° F. to 650° F., preferably about 525° F. The absorption oil is stripped with steam entering the tower through pipe 102, the steam condensate formed in the rectifying section of the tower being withdrawn from collecting trays (not shown) through pipe 103. Sharp separation of the absorption oil from the absorbed hydrocarbons is secured by suitable fractionating trays (not shown) in the rectifying section of the tower in conjunction with cool reflux entering the tower through the pipe 104. The lean absorption oil is withdrawn through pipe 105 by means of pump 106 and is returned to the absorber 89 through pipe 107, heat exchanger 97, pipe 108, cooler 109 and pipe 90.

The overhead products of the tower 101 pass through pipe 110, condenser 111 and pipe 112 into separator 113 where at a pressure of from 245 lbs./sq. in. gauge to 445 lbs./sq. in. gauge, preferably about 320 lbs./sq. in. gauge and a temperature of from 60° F. to 100° F., preferably about 80° F., a separation of some uncondensed $C_2$ hydrocarbons may be effected, these being vented through pipe 114, pressure control valve 115, pipe 116 and pipe 93 into the residue gas pipe 5.

The separator liquid is partly reflux and discharges from the separator 113 through pipe 117, a portion passing through pipe 118 to pump 119 and being returned thereby through pipe 104 to the tower 101 as reflux, the remaining net condensate passing through pipe 120, pressure reducing valve 121 and pipe 122 into feed tank 123. The liquid aromatic-containing products formed during the gas cracking operation and collected in the distillate accumulator 69, are also passed under the pressure existing therein through pipe 124 into pipe 122 to the feed tank 123. Any light $C_2$ hydrocarbons remaining in the liquid passing to the feed tank 123 which hydrocarbons are to be removed from the liquid may be vented from the accumulator through pipe 125, valve 126, pipe 116 and pipe 93 to the low pressure section of residue gas pipe 5.

The liquid in the feed tank 123 contains the desired aromatic-containing products of the nature of motor fuel formed in the low pressure gas cracking and polymerization stages and is withdrawn through the pipe 127 by pump 128 and passed through pipe 129, heat exchanger 130 and pipe 131 into secondary fractionator 132. The fractionator 132 is a conventional stabilizer which may be operated at from 275 lbs./sq. in. gauge to 475 lbs./sq. in. gauge, preferably about 350 lbs./sq. in. gauge, and have suitable reboiling means 133. The bottoms discharged from the reboiler 133 are aromatic-containing products of the nature of motor fuel of 90 to 100 Octane No. CFR Motor Method stabilized as to end point and these pass through pipe 134, heat exchanger 130, pipe 135, cooler 136, pipe 137 and pressure reducing valve 138 into pipe 38 wherein they are blended with the stabilized aromatic products of the high pressure polymerization operation and discharged from the system as the final product.

The overhead products of the fractionator 132 are mostly $C_3$—$C_4$ hydrocarbon compounds which pass through pipe 139, condenser 140 (wherein they are substantially completely condensed) and pipe 141 into reflux accumulator 142. A portion of the condensate is withdrawn from the accumulator 142 through pipe 143 by pump 144 and returned through pipe 145 to the fractionator 132 as reflux. The net condensate in the accumulator 142 flows through the pipe 146 under the existing pressure back into the pipe 1 as recycle entering the system with the fresh gas.

The tar and fuel oil separated from the reaction products following each of the conversion steps and discharged into the feed pipe 19, passes through heater 147 and pipe 148 into stripping tower 149 wherein at a reduced pressure of from 10 lbs./sq. in. gauge to 50 lbs./sq. in. gauge, preferably about 25 lbs./sq. in. gauge, and by the addition of heat, the fuel oil and tar may be stripped of the lower boiling hydrocarbons and passes from the stripping tower through the pipe 150, cooler 151, pipe 152 and pressure reducing valve 153 to storage tanks (not shown). The lower boiling hydrocarbons flow upwardly through fractionating trays (not shown) countercurrent to downflowing reflux, the overhead products passing through pipe 154, condenser 155 and pipe 156 into accumulator 157. The low boiling quench condensate formed is withdrawn from the accumulator through pipe 158 by pump 159 which discharges through the pipe 160. A portion of the distillate in the pipe 160 is returned through pipe 161 and pressure control valve 162 to the tar stripper 149 as reflux.

The net discharge from the pipe 160 passes through supply pipe 163 from which streams may be returned through pipe 164 and pressure control valve 165 to quench accumulator 60, through pipe 166 and pressure control valve 167 to distillate accumulator 23 and through pipe 168 and pressure control valve 169 to quench accumulator 82, respectively.

Although I have described my invention in connection with the conversion of gases containing a substantial proportion of olefinic or unsaturated hydrocarbons, it will be understood that natural hydrocarbon gases or refinery gases of low olefin content may also be treated separately or in conjunction with gases rich in olefins. When the treatment of low olefin containing gases is contemplated, these gases may be fed into the pipe 46 leading to the cracking coil 48 in order to first crack the gases. The resulting products may be treated in the same manner as pointed out with respect to gases fed from primary fractionator 33 and line 49.

When starting with predominantly saturated gas, it is cracked in the coil 48, chilled at 51, and the tar separated from the reaction products in 54. The remaining products pass through condenser 58 and accumulator 60 where part of the reaction products are condensed and recycled as cooling and reflux stock. The remaining uncondensed vapors and gases pass through line 64 and compressor 65 and condenser 67 to accumulator 69. The heavier fractions of the gas, together with the aromatic distillates, are condensed and collected in 69. The $C_2$ compounds, which are not condensed, are then charged through heating coil 71 and reaction coil 72 for polymerization. After separation of the tar from the polymerized reaction products, the remaining products are cooled. The condensate is used for chilling and reflux stock and any excess is passed through line 86′ and joined with the condensate from the cracking stage in line 124. The gases from the polymerization stage are treated with absorbent liquid in tower 89 in order to extract the remaining heavier gas fractions and light vapors therefrom. The unabsorbed gases are eliminated through line 91. The absorbed constituents are eventually passed through line 120 to join the distillate from the cracking stage in line 120. The combined liquid fractions are passed to accumulator 123 and from there to fractionator 132. The gas from fractionator 132, which was dissolved in and separated from the liquid fractions, is recycled through line 146 to the high pressure polymerization coil 12.

While the foregoing description of my process illustrates the treatment of the $C_3$—$C_4$ unsaturates in the high pressure, high temperature polymerization coil and the treatment of the $C_2$ unsaturates formed by cracking or by separation from the gases entering the system, in a separate high temperature, low pressure polymerization coil, it is to be understood that this is by way of example only. My process comprehends broadly the treatment of the polymerizable normally gaseous olefines under polymerizing conditions of heat and pressure which are in so far as is commercially practical, established as most favorable to the differing reaction velocities of the respective hydrocarbons undergoing treatment.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described the invention, what is claimed is:

1. The process for obtaining liquid aromatic hydrocarbons from normally gaseous olefin-containing hydrocarbons, which comprises separating said gaseous hydrocarbons into fractions of successively lower boiling range, separately heating a fraction of higher boiling range to initiate polymerization of the unsaturates present, introducing the heated fraction to a reaction zone wherein formation of polymers occurs, removing the products of reaction from the reaction zone, fractionally separating the products of reaction into a tar fraction, an aromatic polymer fraction and unpolymerized hydrocarbons of successively lower boiling ranges, separately heating unpolymerized hydrocarbons so separated to a temperature at which said hydrocarbons will be converted into unsaturated hydrocarbons, combining gaseous reaction products from the last mentioned conversion step with a first mentioned fraction of lower boiling range than the fraction subjected to the aforesaid polymerization step, separately heating the combined gas fractions to initiate polymerization of the unsaturates present, introducing the heated fractions last mentioned to a separate reaction zone wherein formation of polymers occurs, removing the products of reaction from said last mentioned zone, and fractionally separating said last mentioned products of reaction into a tar fraction, an aromatic polymer fraction and normally gaseous hydrocarbons.

2. The process of claim 1 including recycling only the higher boiling portions of said last mentioned normally gaseous hydrocarbons to said first mentioned heating step for further polymerization.

3. The process for obtaining liquid aromatic hydrocarbons from normally gaseous hydrocarbons, which comprises separating said gaseous hydrocarbons into liquid and gas fractions of successively lower boiling range, separately heating said liquid fraction at high pressure to initiate polymerization of the unsaturates present, introducing the heated fraction to a reaction zone wherein formation of polymers occurs, removing the products of reaction from the reaction zone, and quenching them to inhibit the polymerization reaction, fractionally separating the quenched products into a tar fraction, an aromatic polymer fraction and unpolymerized gas, separately heating said unpolymerized gas and a first mentioned gas fraction at a relatively low pressure to a temperature at which said fractions will be converted to form polymers and substantial quantities of unsaturated hydrocarbons, removing the products of reaction from said last mentioned heating zone, and quenching them to inhibit the cracking reaction, separating the quenched products into a tar fraction, an aromatic polymer fraction and a gas fraction containing unsaturates, separately heating said last mentioned gas fraction together with a first mentioned gas fraction at a relatively low pressure to initiate polymerization of the unsaturates present, introducing the heated fraction last mentioned to a separate reaction zone wherein formation of polymers occurs, removing the products of reaction from said last mentioned reaction zone and quenching them to inhibit the polymerization reaction, fractionally separating the quenched products into a tar fraction, an aromatic polymer fraction and unpolymerized hydrocarbon fraction of successively lower boiling ranges.

4. The process of converting normally gaseous hydrocarbons into low boiling liquid hydrocarbons which comprises subjecting said gas to conditions of time, temperature, and pressure suitable for converting saturated to unsaturated hydrocarbons, separating the reaction products into liquid and gaseous fractions, subjecting said gaseous fractions to high temperature and low pressure suitable for polymerizing unsaturated hydrocarbons to liquids, separating the reaction products from the polymerization step into liquid and gaseous fractions, combining liquid fractions from said conversion and said polymerization steps, separating dissolved gases from said combined liquids, and polymerizing separated gases at higher pressure and lower temperature than those to which said gaseous fractions are subjected in the first polymerization step.

5. Process in accordance with claim 4 in which the second mentioned polymerization step is carried out at temperatures of 1050°–1080° F. and the first mentioned polymerization step is carried out at temperatures of 1100°–1200° F.

6. Method in accordance with claim 4 in which the incondensible gases from the second mentioned polymerization step are eliminated from the system.

7. The process for obtaining liquid aromatic hydrocarbons from normally gaseous hydrocarbons, which comprises separating said gaseous hydrocarbons into fractions of successively lower boiling range, separately heating one of said fractions of higher boiling range under conditions of time and pressure suitable for converting gaseous hydrocarbons into liquid hydrocarbons boiling within the gasoline range, separating the reaction products into a heavy polymer fraction, a fraction containing the gasoline boiling range constituents and a gaseous fraction, combining the last mentioned gaseous fraction with one of said first mentioned fractions of lower boiling range, subjecting the combined fractions to conditions of time, temperature and pressure suitable for converting saturated into unsaturated hydrocarbons, separating liquid from gaseous reaction products, and subjecting the gaseous products to conditions of time, temperature and pressure in a separate reaction zone suitable for polymerizing unsaturated hydrocarbons to aromatic hydrocarbon liquids, said last mentioned temperature and pressure being respectively higher and lower than those to which said gaseous hydrocarbon fraction is subjected in the first mentioned conversion step.

8. Process in accordance with claim 7 in which uncondensed gases from the polymerizing step are eliminated from the system and liquefied gases are recirculated to the first mentioned conversion step.

9. The process for obtaining liquid hydrocarbons from normally gaseous olefin containing hydrocarbons, which comprises separating said gaseous hydrocarbons into a fraction containing chiefly $C_3$ and $C_4$ hydrocarbons and another fraction containing chiefly $C_2$ and lower hydrocarbons, subjecting said $C_3$, $C_4$ fraction to conditions of temperature, pressure and time in a polymerization zone suitable for converting a substantial portion of said fraction to liquid hydrocarbons boiling within the gasoline range, cooling the reaction products, separating the normally liquid from the normally gaseous constituents, subjecting said normally gaseous constituents to conditions of temperature, pressure and time, in a separate conversion zone, suitable for converting a substantial portion of said gaseous constituents to unsaturated hydrocarbons, separating the reaction products from said conversion zone into normally liquid and normally gaseous constituents, mixing said last mentioned gaseous constituents with said fraction containing chiefly $C_2$ and lower hydrocarbons, and subjecting the mixture to polymerization in a separate zone at temperatures higher than and pressures lower than those to which said $C_3$, $C_4$ fractions are subjected.

10. Apparatus for converting hydrocarbon gases to liquid hydrocarbons comprising means for separating said gases into a higher boiling and a lower boiling fraction, means for heating said higher boiling fraction, reacting means for maintaining said heated gases under conversion conditions for a period of time sufficient to convert gaseous hydrocarbons to liquid hydrocarbons, means for separating reaction gases from liquids, a second heating and reacting means, means for charging said reaction gases to said second heating and through said second reacting means, means for separating liquid and gaseous reaction products produced in said second reacting means, a third heating and reacting means, means for charging gaseous products produced in said second reacting means to said third heating and through said third reacting means, and means for optionally charging said lower boiling fraction to said second or said third heating means.

11. Apparatus for converting hydrocarbon gases to liquid hydrocarbons comprising means for heating and reacting said gases, means for passing said gases through said heating and reacting means, means for separating gases from the liquid reaction products, means for cracking gases, means for passing said separated gases through said cracking means, means for separating gases and liquids issuing from said cracking means, a second heating and reacting means, means for charging gases from said cracking means to said second heating and reacting means, means for separating condensible from incondensible products issuing from said second reacting means, means for absorbing the heavier portion of the incondensible products in a liquid absorption medium, means for separating the absorbed constituents from the absorption medium, means for mixing separated constituents with said condensible products, means for separating normally gaseous constituents from normally liquid constituents in said mixture, and means for recycling separated normally gaseous constituents to said first mentioned heating and reacting means.

HERMANN CLAUS SCHUTT.